Feb. 14, 1928.
A. C. HOPKINS
CLAMP
Filed Sept. 13, 1926
1,658,988
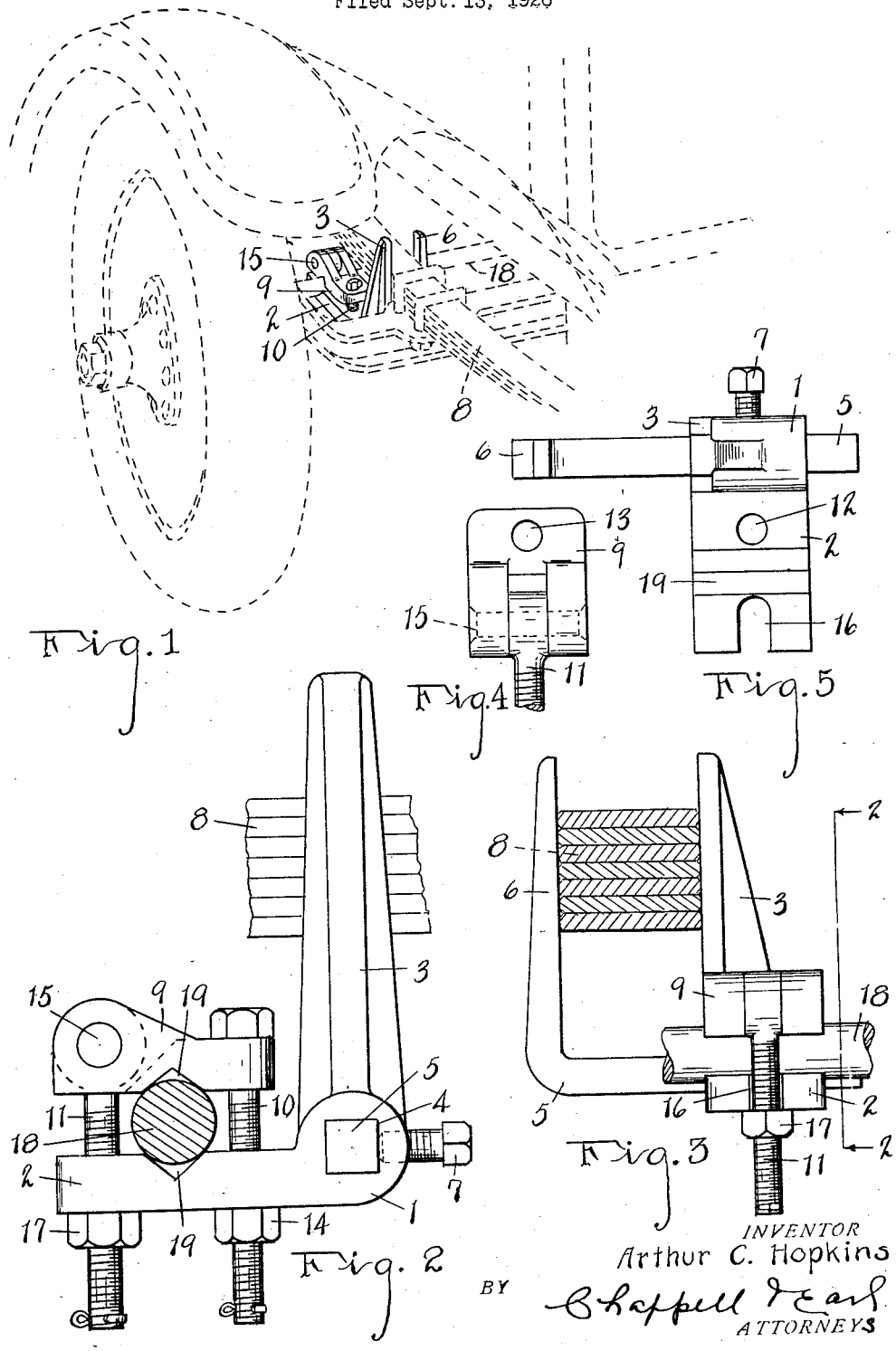
INVENTOR
Arthur C. Hopkins Patented Feb. 14, 1928.

1,658,988

UNITED STATES PATENT OFFICE.

ARTHUR C. HOPKINS, OF NILES, MICHIGAN, ASSIGNOR TO NATIONAL STANDARD COMPANY, OF NILES, MICHIGAN.

CLAMP.

Application filed September 13, 1926. Serial No. 135,271.

The main object of this invention is to provide an improved steering clamp for locking the steering wheels of towed motor vehicles which may be quickly applied and removed and is simple in structure.

A further object is to provide a steering clamp which is readily adapted to different sizes and makes of motor vehicles.

Objects pertaining to details and economies of my invention will definitely appear from the detailed description to follow. The invention is clearly defined and pointed out in the claims.

A structure embodying the features of my invention is clearly illustrated in the accompanying drawing forming a part of this application, in which:

Fig. 1 is a front perspective view of a motor vehicle with one of my improved steering clamps in operative position thereon, only such parts of the vehicle being shown as are deemed necessary to show the manner of using the clamp, and these parts are shown conventionally.

Fig. 2 is a fragmentary view partially in vertical section on line 2—2 of Fig. 3.

Fig. 3 is an elevation looking from the left in Fig. 1, a fragment of spring and of a steering spindle connecting rod being shown in operative relation to the clamp.

Fig. 4 is a plan view of the adjustable clamp member with the pivoted clamping bolt extended and partially broken away.

Fig. 5 is a top view of the clamp with the adjustable jaw or clamp members removed.

Referring to the drawing my improved clamp comprises an L-shaped main body member 1, the horizontal arm of which constitutes a relatively fixed jaw member 2 and the vertical arm a fork member 3. The body member 1 has a non-circular transverse opening 4 at the angle thereof through which the supporting arm 5 of the fork member 6 is arranged. The arm 5 is secured in the opening by means of the set screw 7. This enables the adjustment of the forks to engage some fixed part of the chassis of a motor vehicle as the spring indicated at 8.

The adjustable jaw member 9 is supported to coact with the fixed jaw member 2 by means of the bolts 10 and 11, the bolt 10 being arranged through the opening 12 in the clamp member 2 and the opening 13 in the clamp member 9. An adjusting nut 14 is provided for this bolt.

The clamping bolt 11 is pivoted at 15 to the clamp member 9 and is adapted to be engaged with the open slot 16 in the end of the fixed jaw member, a clamping nut 17 being provided. This permits the ready engagement and disengagement of the clamp with the steering spindle connecting rod as 18. The clamp members have opposed notches 19 for more effectively gripping the rod.

In Fig. 1 I have illustrated my improvements as used on the type of vehicles having springs mounted longitudinally of the vehicle on the front axle. On certain other types of vehicles the clamp is inverted and the forks engage with a radius rod, the forks being made adjustable to facilitate engagement; in fact, the fork member 6 may be quickly removed and replaced in applying and removing the clamp.

Having thus described my invention what I claim as new and desire to secure by Letters Patent is:

1. A steering clamp for motor vehicles comprising an angled body member one arm of which constitutes a relatively fixed steering spindle connecting rod clamp member and the other a fork member adapted to engage a relatively fixed part of a vehicle chassis, there being a transverse opening at the angle of said body member, an adjustable fork member having an arm slidable through said opening in said body member, an adjustable fork member having an arm slidable through said opening in said body member, a set screw for securing said adjustable form member in its adjusted positions, an adjustable clamp member, said clamp members having opposed transverse notches in their faces, a clamping bolt arranged through the inner end of said clamp members and provided with an adjusting nut, and a second clamping bolt pivotally mounted on the outer end of the adjustable clamp member and provided with an adjusting nut, said clamp member having an open slot at its outer end to permit the engagement and disengagement of said pivoted clamping bolt therewith.

2. A steering clamp for motor vehicles comprising an angled body member one arm of which constitutes a relatively fixed steering spindle connecting rod clamp member and the other a fork member adapted to engage a relatively fixed part of a vehicle chassis, there being a transverse opening at the angle of said body member, an adjustable fork member having an arm slidable through said opening in said body member, a set screw for securing said adjustable fork member in its adjusted positions, an adjustable clamp member, and clamping bolts for said clamp members.

3. A steering clamp for motor vehicles comprising an angled body member one arm of which constitutes a relatively fixed steering spindle connecting rod clamp member and the other a fork member adapted to engage a relatively fixed part of a vehicle chassis, an adjustable fork member adjustably mounted on said body member, an adjustable clamp member, a clamping bolt arranged through the inner end of said clamp members and provided with an adjusting nut, and a second clamping bolt pivotally mounted on the outer end of the adjustable clamp member and provided with an adjusting nut, said clamp member having an open slot at its outer end to permit the engagement and disengagement of said pivoted clamping bolt therewith.

4. A steering clamp for motor vehicles comprising an angled body member one arm of which constitutes a relatively fixed steering spindle connecting rod clamp member and the other a fork member adapted to engage a relatively fixed part of a vehicle chassis, an adjustable fork member adjustably mounted on said body member, an adjustable clamp member, and clamping bolts for said clamp members.

5. A steering clamp for motor vehicles comprising a pair of clamp members adapted to engage the steering spindle connecting rod of a motor vehicle, one of said clamp members being provided with an upwardly projecting fixed fork member, and a coacting spring engaging fork member mounted on one of said clamp members for lateral adjustment relative to the fixed fork member.

In witness whereof I have hereunto set my hand.

ARTHUR C. HOPKINS.